United States Patent [19]
Davidson et al.

[11] Patent Number: 5,644,007
[45] Date of Patent: Jul. 1, 1997

[54] CONTINUOUS PROCESS FOR THE PRODUCTION OF POLY(1-ALKENES)

[75] Inventors: Robert S. Davidson, Edina; Robert W. Ferguson, Maplewood; Barry E. Heldman, Cottage Grove; Timothy J. Diekmann, Wyoming; Anthony R. Maistrovich, Woodbury, all of Minn.; James A. Higgins, River Falls, Wis.; Mark D. Gehlsen, Eagan, Minn.

[73] Assignee: Minnesota Mining and Manufacturing Company, St. Paul, Minn.

[21] Appl. No.: 644,611

[22] Filed: Apr. 26, 1996

[51] Int. Cl.$^6$ .................................................... C08F 10/14
[52] U.S. Cl. ............................. 526/64; 526/65; 526/88; 526/348.2; 526/348.3; 526/348.6
[58] Field of Search ......................... 526/64, 65, 88, 526/348.2, 348.3, 348.6

[56] References Cited

U.S. PATENT DOCUMENTS

| | | | |
|---|---|---|---|
| 2,894,824 | 7/1959 | Lanning | 23/285 |
| 3,074,922 | 1/1963 | Dye et al. | 260/94.9 |
| 3,542,717 | 11/1970 | Lipman | 260/27 |
| 3,635,755 | 1/1972 | Balinth et al. | 117/122 P |
| 3,954,697 | 5/1976 | McConnell et al. | 526/350 |
| 4,058,654 | 11/1977 | Sutter et al. | 526/159 |
| 4,071,325 | 1/1978 | Platz et al. | 526/64 |
| 4,178,272 | 12/1979 | Meyer, Jr. et al. | 260/27 R |
| 4,288,358 | 9/1981 | Trotter et al. | 260/31.8 M |
| 4,383,093 | 5/1983 | Shiraki et al. | 526/64 |
| 4,482,687 | 11/1984 | Noshay et al. | 526/125 |
| 4,530,914 | 7/1985 | Ewen et al. | 502/113 |
| 4,792,595 | 12/1988 | Cozewith et al. | 526/348 |
| 4,808,561 | 2/1989 | Welborn, Jr. | 502/104 |
| 4,892,851 | 1/1990 | Ewen et al. | 502/104 |
| 5,296,433 | 3/1994 | Siedle et al. | 502/117 |
| 5,436,305 | 7/1995 | Alt et al. | 526/160 |
| 5,521,263 | 5/1996 | Seeger et al. | 526/68 |

FOREIGN PATENT DOCUMENTS

WO 96/11963  4/1996  WIPO .

OTHER PUBLICATIONS

Boor, *Ziegler–Natta Catalysts and Polymerizations*, "Polymerization of Monomers," Ch. 19, pp. 512–562, Academic Press, Inc. (1979).

Christie, "Equipment Design Considerations for Processing with Metallocene Resins," *5th International Business Forum on Specialty Polyolefins*, (Sep. 20–22, 1995).

Odian, *Principles of Polymerization* (2d ed.) "Ziegler–Natta Polymerizations of Nonpolar Vinyl Monomers," Ch. 8.4, pp. 591–623, John Wiley & Sons (1981).

Ogawa et al., "Melt Flow Rate Control in an Industrial High Density Polyethylene Polymerization Process," *AIChE 1994 Annual Meeting*, 1–32 (Dec. 1994).

Sorenson et al., *Preparative Methods of Polymer Chemistry*, 2d ed., pp. 46–50, John Wiley & Sons (1968).

Zacca et al., "Modelling of the Liquid Phase Polymerization of Olefins in Loop Reactors," *Chemical Engineering Science*, vol. 48, No. 22, 3743–65 (Nov. 1993).

*Primary Examiner*—Thomas R. Weber
*Attorney, Agent, or Firm*—Gary L. Griswold; Walter N. Kirn; Carolyn V. Peters

[57] ABSTRACT

Described herein is a continuous process for polymerizing 1-alkenes. In this process, which operates free of any hydrogen control feed, the resultant polymer has an inherent viscosity that is closely centered around a predetermined targeted value. If desired, the targeted value can be changed while the process is being performed. The process is carried out in a reactor that allows for essentially plug flow of material passing therethrough. Additionally, the temperature profile of the reactor is controllable.

20 Claims, 1 Drawing Sheet

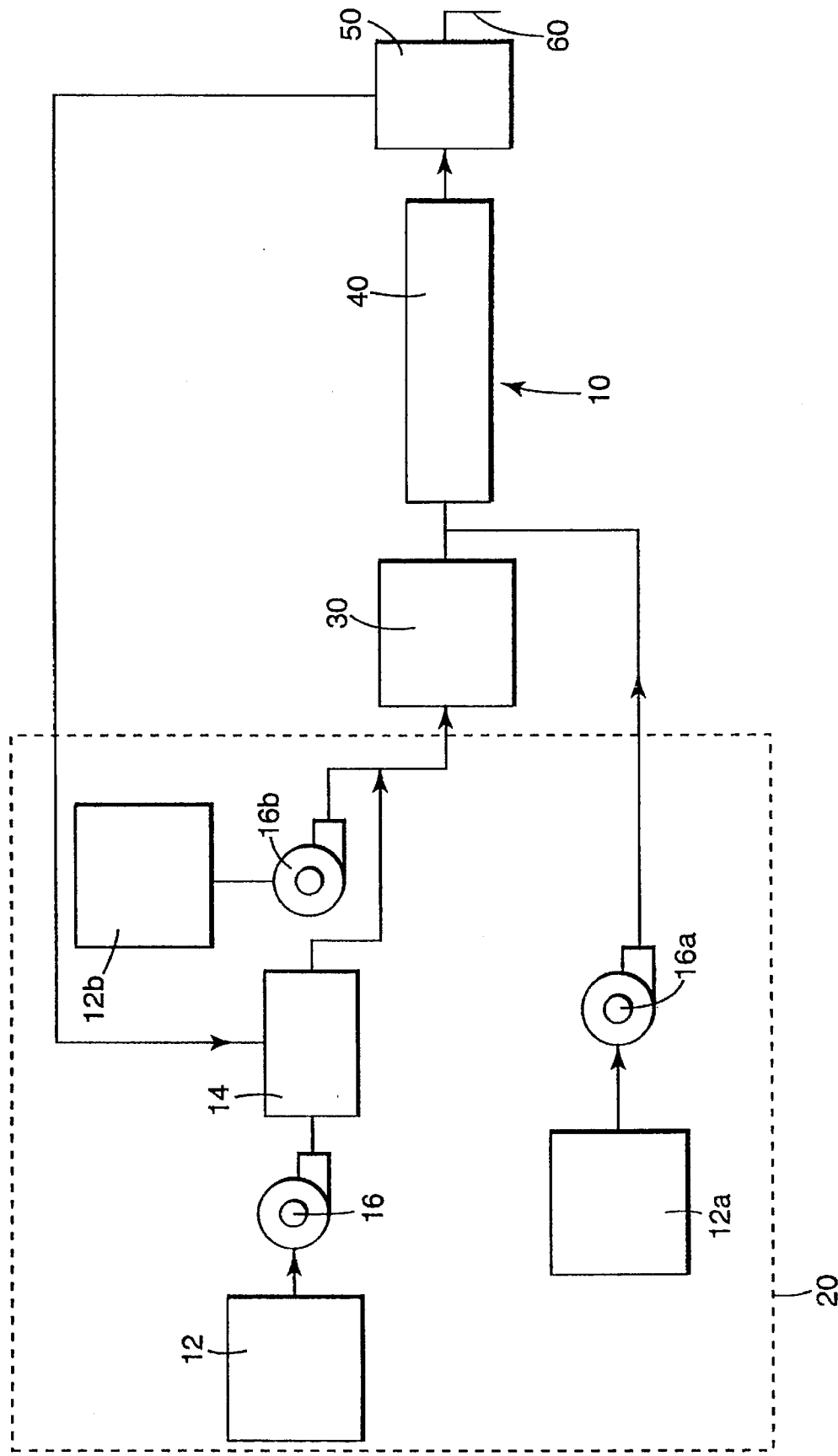

CONTINUOUS PROCESS FOR THE PRODUCTION OF POLY(1-ALKENES)

BACKGROUND OF THE INVENTION

1. Field of the Invention

The present invention relates to a continuous process for polymerization of 1-alkenes. In this process, the inherent viscosity of the polymer product remains centered around a targeted inherent viscosity value.

2. Background Information

In the area of viscoelastomeric materials, especially pressure sensitive adhesives (PSAs), precise and predictable control over various mechanical and process properties is desirable so that the materials can be tailored for specific, highly demanding end use applications such as packaging tapes, medical tapes, masking tapes, and vibration damping materials. These applications require a proper balance of properties, and this balance changes with each end use.

With the discovery of the catalytic activity of Ziegler-Natta (ZN) coordination systems toward 1-alkenes (i.e., α-olefin monomers) and the subsequent production of high molecular weight poly(α-olefins), the elimination of double bonds from the polymer backbone, which had detracted from the oxidative stability of such polymers, became possible. The homopolymers of $C_6$ to $C_{10}$ α-olefins were naturally tacky, had low toxicity, aged well, and were environmentally stable (i.e., did not oxidize readily), chemically inert, resistant to plasticizer migration, and relatively inexpensive. These characteristics made them good candidates for PSAs. However, their poor cohesive strength meant that they lacked the shear adhesion required of high performance PSAs. Some examples of the preparation of poly(α-olefin) PSA compositions via ZN catalysis include U.S. Pat. No. 3,542,717 (mixtures of polyolefin copolymers derived from olefin monomers with different molecular weights), U.S. Pat. Nos. 3,954,697 and 4,178,272 (hot-melt adhesives derived from copolymers of propylene and $C_6$ to $C_{10}$ α-olefins), and U.S. Pat. No. 4,288,358 (compositions containing, inter alia, terpolymers of propylene, 1-butene/1-pentene, and $C_6$ to $C_{10}$ α-olefins).

More recently, radiation curing of α-olefin homo- or copolymer compositions (ZN-catalyzed) has been shown to provide PSAs with a good balance of peel and shear properties, and metallocene catalysts have been identified as catalysts for olefin polymerizations. (These catalysts are capable of producing very stereoregular homopolymers as well as copolymers that can include a high ratio of mer units derived from lower 1-alkenes such as ethylene and propylene.)

The production of poly(α-olefins) has been described in a wide variety of reaction vessels and polymerization methods including continuous stirred tank reactors (e.g., U.S. Pat. No. 3,074,922), loop reactors (e.g., Zacca et al., "Modeling of the Liquid Phase Polymerization of Olefins in Loop Reactors," *Chem. Eng. Sc.*, 48, no. 22, 3743–65 (1993)), tubular reactors (e.g., U.S. Pat. No. 4,383,093), screw conveyors (e.g., U.S. Pat. No. 2,894,824), extruders (e.g., U.S. Pat. No. 4,058,654), fluid bed reactors (e.g., U.S. Pat. No. 4,482,687), and static mixer reactors, (e.g., U.S. Pat. No. 4,792,595). However, consistent control, over time, of the molecular weight (MW) of the resultant polymer has proven elusive. For example, in the loop reactor polymerization described in the Zacca et al. reference, temperature oscillations are unavoidable. Such oscillations cause the MW of the polymer (as measured by its inherent viscosity) to fluctuate over time. This results in polymer fractions that are undesirably high and low. Control over MW is imperative if the resulting polymer is to be useful as a high performance PSA material.

Chain transfer agents, especially hydrogen because of its cost and availability, have been used to control the MW of polymers including poly(α-olefins). However, many chain transfer agents are pyrophoric and/or explosive and, therefore, present significant safety and handling challenges. Additionally, control of the MW of the poly(α-olefins) is complicated by the degree that the chain transfer agent (especially when a gas such as hydrogen is used) is able to mix with the reaction mixture.

That which has not been described previously is a continuous method of producing poly(α-olefins) that provides consistent control over MW of the resulting polymer without using a chain transfer agent such as hydrogen gas.

SUMMARY OF THE INVENTION

Briefly, the present invention provides a process for the continuous production of a poly(α-olefin) having a targeted inherent viscosity (I.V.) comprising the steps:

a) in a reactor comprising one or more sections, the temperature of each of the sections being independently controllable so as to provide a temperature profile, mixing (1) at least one α-olefin monomer that is or can be made a liquid at a temperature of about 20° to 100° C. and a pressure no greater than about 1000 kPa and (2) a catalyst system so as to form a reaction mixture that comprises the monomer(s), the catalyst system, and the polymerization product of the monomer(s), and b) allowing the monomer(s) to continue to polymerize while the reaction mixture travels in an essentially plug flow manner through the reactor.

In this process, the I.V. of the poly(α-olefin) remains within about 0.2 dL/g, preferably about 0.15 dL/g, more preferably within about 0.1 dL/g, most preferably within about 0.05 dL/g of the targeted I.V. within five residence times, preferably four residence times, more preferably three residence times, most preferably two residence times of the reactor. This I.V. control is accomplished without the use of any hydrogen control feed.

The process of the present invention requires that the temperature profile of the reactor be controllable over time and that the reaction mixture be impelled in a relatively plug flow manner through the reactor. This allows the reaction mixture in the reactor at a given time to pass through the same reaction conditions as those encountered by previous and subsequent reaction mixture portions as they pass through the reaction zone (i.e., the portion of the reaction system where the bulk of polymerization occurs).

These necessary characteristics—temperature control and movement of the reaction mixture in an essentially plug flow manner—are complicated by the type of reaction being performed, i.e., the polymerization of 1-alkenes. This type of polymerization is highly exothermic, which makes controlling the temperature of the reaction mixture all the more difficult. The reaction mixture becomes extremely viscous even at low percentages of conversion, thus making plug flow of the reaction mixture an even greater challenge. Also, high levels of residual catalyst in the final product are undesirable; yet the reaction is slow when dilute catalyst solutions are used. Nevertheless, high conversion levels are necessary for the process to have significant industrial applicability. These challenges have faced the skilled artisan for a number of years, but the process of the present invention is believed to be the first to address them simultaneously.

The reactor can be a stirred tubular reactor (STR), an extruder, a static mixer, or any other type of reactor in which a reaction mixture can move therethrough in an essentially plug flow manner. Combinations of these types of reactors are also possible. Regardless of the type of reactor chosen, the temperature of the reactor must be controllable to the extent that the reaction mixture in the reaction zone at time $t_1$ can experience essentially the same temperature profile as the reaction mixture at some other time $t_2$. These two characteristics—plug flow and temperature profile control—are believed to be that which allows the MW of the polymer product (as measured by its I.V.) to remain centered around a targeted value, which value can be changed in a controlled manner so as to produce polymer with an I.V. that differs from that of the original target. STRs, static mixers, and extruders are useful because they provide for essentially plug flow of the reaction mixture and can be configured such that good temperature control can be attained.

The process of the present invention allows for the production of poly($\alpha$-olefin) where the MW of the polymer product (as measured by its I.V.) can be tailored to match one or more targeted MWs. This does not mean that the process of the present invention consistently provides for a narrow MW distribution. That feature is dependent primarily on the type of catalyst system used, with multi-site catalysts (e.g., ZN systems) generally providing wider MW distributions and single-site catalysts (e.g., metallocene catalyst systems) generally providing narrower MW distributions.

Rather than affecting the MW distribution of the polymer product, the process of the present invention provides consistent control over the location of the peak of the MW distribution curve. In other words, rather than providing control over the shape of the MW distribution curve, the process of the present invention provides, over time, control over where the peak of the MW distribution curve is located. Thus, where one desires a large amount of, for example, poly(1-octene) with an I.V. of 2.1 dL/g is desired, the process of the present invention allows such a polymer to be made. Poly(1-octene) exiting a reactor used in the process of the present invention at time $t_1$ will have an I.V. very near 2.1 dL/g, as will poly(1-octene) exiting the reactor at time $t_2$, where a substantial amount of time separates $t_1$ and $t_2$. Once the polymer product reaches its target I.V., samples thereof taken from the reactor at different times will have I.V.s vary from the targeted value by no more than about 20%, preferably by no more than about 10%, more preferably by no more than about 5%.

If desired, the targeted I.V. value can be changed while the polymerization process is ongoing by changing one or more of the temperature profile, a catalyst system component, and/or the amount(s) of the catalyst system components (especially the amount of cocatalyst when one is used). Once the I.V. of the polymer product reaches the changed target I.V. value, the I.V. of the polymer remains centered around this new target value. Thus, "on the fly" changes to the desired polymer product can be accomplished.

Control over the location of the peak of the MW curve is important because of the performance characteristics imparted to the polymer product through this feature. For example, where production of large amounts of a polymer to be used in a PSA formulation is desired, having all of the polymer possess an I.V. very near the desired value of, e.g., 2.1 dL/g (i.e., having all the polymer with nearly the same MW distribution) can result in a PSA with better performance characteristics (for some applications) than does a formulation where polymers having I.V.'s of, for example, 0.6, 1.7, 2.6, and 3.4 dL/g have been blended to provide an overall I.V. of 2.1. Blending polymers with different I.V.'s can result in a polymer blend with an overall I.V. of a desired value but also having significant fractions with I.V.'s too low to crosslink satisfactorily (during subsequent curing) and other fractions with I.V.'s that are too high to allow the blend to be handled and processed readily.

The process of the present invention can be used to prepare poly(1-alkenes) with target I.V.'s ranging from about 0.6 to about 4.5 dL/g. Poly(1-alkenes) at the high end of this range have heretofore been difficult to prepare because of processing and handling problems. This versatility is very valuable, especially when considered along with the aforementioned control over polymer I.V.

In the process of the present invention, no gaseous hydrogen feed is necessary to aid in the control of molecular weight of the polymer. Hydrogen is explosive and thus presents a significant safety and handling challenges. Also, gaseous hydrogen does not uniformly mix with most liquid monomer(s). This results in mass transfer problems that can adversely affect the polymer I.V. over time.

Unless a contrary indication is evident, the following definitions apply herein:

"$\alpha$-olefin monomer" means a straight chain or branched 1-alkene;

"poly($\alpha$-olefin)" means the polymerization product of one or more $\alpha$-olefin monomers;

"inherent viscosity" means the viscosity calculated according to the formula $\ln(V_{rel})/C$ where ln is the natural logarithm function, $V_{rel}$ is the relative viscosity of a dilute polymer solution (i.e., the ratio of the viscosity of the solution to the viscosity of the solvent), and C is the concentration of the polymer solution (see also pages 46–50 of Sorenson et al., "Preparative Methods of Polymer Chemistry," 2d ed., New York (1968));

"continuous" means that reactants enter a reactor at the same time (and, generally, at the same rate) that polymer product is exiting the same reactor;

"residence time" means the time necessary for a theoretical slice of reaction mixture to pass completely through a reactor;

"reaction zone" means that portion of a reactor system where the majority of reaction occurs; and "temperature profile" means the range and chronological order of temperatures experienced by a reaction mixture in a reactor.

BRIEF DESCRIPTION OF THE DRAWING

FIG. 1 is a schematic representation of a reaction system useful for carrying out the polymerization process of the present invention.

DETAILED DESCRIPTION OF PREFERRED EMBODIMENTS

Referring to FIG. 1, reaction system 10 includes reaction mixture delivery system 20, optional heat exchanger 30, reactor 40, optional devolatization mechanism 50, and outlet 60. Each of these individual elements is known in the art, and none individually are the subject of this invention. Rather, the manner these elements are combined and controlled provide, consistently over time, control over the MW distribution of the polymer produced by the described process. This control advantage is accomplished without the use of any gaseous hydrogen control feed.

Reaction mixture delivery system 20 comprises component feed supply units 12, 12a, and 12b, purification unit 14, and pumps 16, 16a, and 16b.

A. Reaction mixture

The material fed into the reactor (i.e., the reaction mixture) includes, at a minimum, one or more 1-alkene monomers and a catalyst system, which generally includes a catalyst component and a cocatalyst component although some single component catalyst systems are known. Prior to entering the reaction zone, this reaction mixture is stored, purified, and delivered to the reactor. Monomer, catalyst, and cocatalyst are stored in component feed supply units 12, 12a, and 12b, respectively.

For some catalyst systems, the catalyst and cocatalyst components can be stored together, or the cocatalyst can be stored along with the monomer. In such situations, supply unit 12b can be omitted. If desired, a number of feed supply units 12, 12a, and 12b can be present in reaction system 10. By having all but one of, for example, catalyst feed supply units 12a closed off, one type of catalyst can be used; then, if desired, that unit 12a can be closed and another unit 12a (containing a different catalyst) can be opened. Such constructions and their operations are within the capabilities of one of ordinary skill in the art.

In the polymerization process of the present invention, at least one 1-alkene that is a liquid or can be liquified at a temperature of about 20° to about 100° C. and a pressure no greater than about 1000 kPa (i.e., about 130 psig) is present in the reaction mixture. Those α-olefins that are liquids or are easily liquified under these conditions include straight chain $C_4$–$C_{24}$ α-olefins, and branched $C_6$–$C_{24}$ α-olefins such as, for example, 4-methyl-1-pentene, 3-methyl-1-hexene, 4-methyl-1-hexene, 3-methyl-1-pentene, and 3-ethyl-1-pentene. Preferred among such monomers are those that are liquids at 20° to 80° C. and atmospheric pressure such as, for example, straight chain $C_5$–$C_8$ α-olefins and 4-methyl-1-pentene. For PSA materials, preferred monomers are those that polymerize to a non-crystalline polymer, specifically $C_5$–$C_{12}$ α-olefins, more preferably $C_6$–$C_{10}$ α-olefins. For low surface energy polymers (e.g., those used for release materials), preferred monomers include $C_{12}$–$C_{24}$ α-olefins.

Other monomers can be copolymerized with the above-described liquid or liquifiable monomers. Such copolymerizable monomers include, for example, polyenes such as $C_6$–$C_{14}$ α, ω-dienes, branched dienes, conjugated dienes, trienes, terpenes, cyclic dienes, and alkenyl norbornenes of the formula

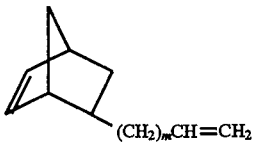
(CH₂)ₘCH=CH₂ where m is an integer from 1 to 18 gaseous α-olefins that cannot be liquified under the previously stated conditions (e.g., ethylene and propylene); and α-olefins that are waxes or solids at the previously stated conditions but that can be liquified at temperatures up to about 150° C. (e.g., $C_{24}$–$C_{40}$ α-olefins).

Examples of suitable α,ω-polyene containing at least 8 carbon atoms are 1,7-octadiene, 1,8-nonadiene, 1,9-decadiene, 1,10-undecadiene, 1,11-dodecadiene, 1,12-tridecadiene, 1,13-tetradecadiene, 1,4,9-decatriene, 1,5,9-decatriene, 1,6,9-decatriene, 1,5,9,13,17-octadecapentadiene, 1,9,17-octadecatriene, 1,4,7-octatriene and the like. Among these, 1,7-octadiene and 1,13-tetradecadiene are particularly preferred.

Examples of branched 1,4-dienes are 4-methyl-1,4-hexadiene, 5-methyl-1,4-hexadiene, 4-ethyl-1,4-hexadiene, 4,5-dimethyl-1,4-hexadiene, 4-methyl-1,4-heptadiene, 4-ethyl-1,4-heptadiene,5-methyl-1,4-heptadiene, 4-ethyl-1,4-octadiene, 5-methyl-1,4-octadiene and 4-n-propyl-1,4-decadiene. Amongst these, 4-methyl-1,4-hexadiene and 5-methyl-1,4-hexadiene are particularly preferred.

Copolymerizable monomers can be present in amounts ranging up to about 99% (by wt.), especially where lower alkenese are used, preferably up to about 95% (by wt.), more preferably up to about 50% (by wt.).

Using 1-alkenes that polymerize to a polymer product that is soluble in the reaction mixture is preferred. For example, poly(1-hexene) and poly(1-octene) are soluble in 1-hexene and 1-octene, respectively. These types of monomer-polymer combinations are preferred. Also, that all components of the reaction mixture be liquids or substantially dissolved in one or more liquid components (at the reaction conditions) is preferred. In certain embodiments, the reaction mixture can include one or more solvents.

If desired (e.g., for heat transfer purposes), the monomer(s) can be delivered to the reactor in one or more solvents (e.g., liquid alkanes); however, the presence of solvent can lead to increased polymer isolation/purification steps. Those skilled in the art know the wide variety of solvents that can be used with the above-described monomers.

The reactor feed also contains some type of catalyst system. A common catalyst system is a ZN catalyst system, which involves a transition metal compound or complex (e.g., TiCl₃ or TiCl₄) and an organometallic cocatalyst. Useful ZN catalysts include, for example, Akzo™ Titanium Trichloride AA series catalysts (Akzo Chemicals Inc.; Chicago, Ill.) and Lynx™ catalyst (Catalyst Resources Inc.; Houston, Tex.). Useful ZN cocatalysts include, for example, triethylaluminum, diethylaluminum chloride, triisobutyl aluminum, and ethylaluminum sesquichloride. ZN catalysts are well known to those of ordinary skill in the art and are not the subject of this invention. Their use is summarized in Odian, "Principles of Polymerization," (2d ed.), Ch. 8.4 (J. Wiley & Sons, New York, 1981). For a more detailed discussion, see Boor, "Ziegler-Natta Catalysts and Polymerizations," Ch. 19 (Academic Press, New York, 1979).

Supported ZN catalysts (i.e., a traditional transition metal compound bound to an inorganic substrate) have begun to be used as catalysts in α-olefin polymerizations. For example, TiCl₄ supported on MgCl₂ powder is commercially available as Lynx™ 715 (Catalyst Resources Inc.). Because such supported ZN catalysts often are more active (on a weight basis) than regular ZN catalysts, lesser amounts can be used. Such supported catalysts also can be used as the catalyst system in the process of the present invention.

Metallocene catalyst systems (which include single-component systems and systems that require a cocatalyst) have come to be recognized as a second broad class of viable catalysts for α-olefins. They too can be used as the catalyst system in the process of the present invention. As with ZN catalysts, metallocene catalyst systems themselves are not the subject of this invention; rather, they are known to the skilled artisan. Various metallocene catalysts are described in U.S. Pat. Nos. 5,296,433, 5,436,305, 5,416,177, 4,530,914, 4,808,561, and 4,892,851, which catalysts and the methods of making the same described therein are incorporated herein by reference.

One or more solvents or monomers can be used to aid in solubilizing the catalyst and/or cocatalyst or diluting one or both so as to improve metering accuracy. For example, where triethylaluminum is used as the cocatalyst in a ZN catalyst system, a liquid alkane such as hexane or heptane can be used as a solvent. Mixing the catalyst components with monomer helps to limit the amount of non-reactive components present in reaction system 10 which, in turn, simplifies isolation/purification of the ultimate polymer product.

For a variety of reasons, including the undesirability of residual catalyst in the ultimate polymer product, keeping the concentration of catalyst system as low as possible is preferred; however, in certain circumstances (e.g., to maximize conversion to polymer), a greater amount might be desired. Catalyst system component feed rates are discussed below.

In addition to the necessary reaction mixture components, other compounds that can modify the properties of the polymer product can be introduced into the reactor. For example, one or more of preformed polymers, inert tackifiers, chain transfer agents, pigments, and fillers can be added to the reaction mixture.

B. Purification

The monomer(s) is/are impelled from feed supply 12 to purification unit 14 via pump 16. In most instances, catalyst and cocatalyst are fed directly to reactor 40 by pumps 16a and 16b.

ZN and most metallocene catalysts are notoriously sensitive to a variety of deactivating species including, inter alia, $H_2O$ and $O_2$. Therefore, scrupulous care must be taken to exclude such species from the monomer(s), solvents, and any additives. This is done by purification unit 14.

Preferred purification methods include sparging the monomer(s) with an inert gas (e.g., $N_2$) and passing the combined stream of the monomer(s) and any solvent to be used in the catalyst and/or cocatalyst solutions through one or more purification columns. Such columns are packed with particles that selectively remove dissolved species. For example, molecular sieves and a variety of desiccants can remove $H_2O$ while activated copper can remove $O_2$ from fluids coming into contact therewith. Those skilled in the art are aware of the importance of removal of $H_2O$ and $O_2$ from reaction mixture components as well as numerous ways of accomplishing the same. Regardless of the means chosen to accomplish purification, the monomer(s) stream exiting purification unit 14 preferably has $H_2O$ and $O_2$ concentrations below about 100 parts per million (ppm), most preferably at or below 1 ppm. Oxygen levels in the combined stream can be measured with, for example, a liquid-phase $O_2$ sensor (such as are available from, e.g., Orbisphere Laboratories; Geneva, Switzerland), which monitors the partial pressure of $O_2$ in equilibrium with the liquid components. Water levels in the combined stream can be measured with a liquid-phase $H_2O$ sensor (such as are available from Panametrics Inc.; Waltham, Mass.). Low water and oxygen concentrations ensure that very little catalyst is deactivated, thus tempering the need for excess catalyst and/or cocatalyst. Catalyst, cocatalyst, and monomer(s) are then mixed at the inlet of reactor 40 or are introduced through separate inlets and mixed at some point downstream from the inlet end of reactor 40.

The reaction mixture components (typically monomer(s), catalyst, and cocatalyst) are impelled from component feed supply units 12, 12a, and 12b by pumps 16, 16a, and 16b, respectively. Although a pressure feed (i.e., a pressurized tank with a control valve) can be used for each component, the components preferably are impelled by pump mechanisms. A wide variety of pump designs can be useful in the present invention as long as the pump seal is sufficient to exclude oxygen, water, and similar catalyst deactivating materials out of feed supply units 12, 12a, and 12b. Examples of potentially useful pumps include gear pumps, diaphragm pumps, centrifugal pumps, piston pumps, and peristaltic pumps.

Certain catalyst systems (e.g., ZN transition metal compounds) are delivered to reactor 40 in the form of a slurry. Such catalyst systems can settle in feed supply unit 12a and in pump 16a unless care is taken. A mechanism to keep the catalyst system well mixed in feed supply unit 12a is preferred. Examples include multiple agitator blades and a pump-around loop. Alternatively, if thermodynamically feasible and compatible with the end use of the polymer, a thicker fluid (e.g., mineral oil) can be used as the slurrying fluid. Additionally, such catalyst systems preferably are impelled to reactor 40 by means of pump 16a that can easily handle slurries, examples of which include peristaltic and diaphragm pumps.

The tubing used to transport the reaction mixture components to reactor 40 must be capable of handling high pressure and of essentially excluding those materials capable of deactivating the catalyst and/or cocatalyst being used. For example, where a standard ZN catalyst system is used, the tubing must be capable of substantially excluding water and oxygen. Useful tubing materials include stainless steel, polypropylene, polyethylene, and polytetrafluoroethylene. Where a peristaltic pump is used as one of pumps 16, 16a, and 16b, the tubing therefor preferably is a fluoroelastomer.

The rate at which pumps 16, 16a, and 16b impel the reaction mixture components to reactor 40 can be adjusted so that the residence time of the reaction mixture in reactor 40 is at or near a desired level. Typical residence times for 10 and 20 L STRs range from as low as five minutes up to about 60 minutes, preferably from about 10 minutes to about 50 minutes, more preferably from about 20 to about 40 minutes, most preferably about 30 minutes. Thirty minutes has been found to allow the catalyst concentration to be maintained at a relatively low level while allowing a sufficient flow of reaction mixture such that a large amount of solvent does not have to be added (for heat transfer purposes). In general, monomer feed rate ranges from about 3 L/hour to 120 L/hour or more; catalyst feed rate is maintained such that the catalyst concentration (when the catalyst is a ZN system) in reactor 40 is between about 2 to about 600 ppm and the catalyst concentration in the polymer product is preferably below about 150 ppm, more preferably below about 100 ppm; and cocatalyst feed rate is such that its molar concentration relative to the catalyst is maintained between about 1.5:1 to about 1000:1. Of course, feed rates and reaction mixture component concentrations can vary with reactor type and degree of polymerization desired.

C. Reactor

Reactor 40 can be any type of reactor design that allows for essentially plug flow of the reaction mixture as well as temperature control. Common examples include STRs, extruders, and static mixers, each of which is discussed separately below. Also, the type of reactor used should be such that the residence time thereof is no more than about 300 minutes, preferably no more than about 60 minutes, more preferably no more than about 45 minutes, most preferably no more than about 30 minutes. Lower residence times can result in less waste during changeover (i.e., a change in the type of monomer or catalyst being used, the ratio of monomers, the amount(s) of catalyst and/or cocatalyst, the targeted I.V., etc.) and substantially reduced response time to process condition changes.

Prior to being used in the process of the present invention, reactor 40 preferably is sweetened. Commonly, sweetening is accomplished by filling reactor 40 with a dilute solution of a cocatalyst and allowing it to stand for, e.g., about 24 hours. Thereafter, a gaseous sparge can be used during the removal of the sweetening mixture.

Reaction mixture components are delivered from purification unit 14 and the catalyst feed storage unit 12a to reactor 40 by means of pressure created by pumps 16, 16a, and 16b. Before reaching reactor 40, the reaction mixture components optionally can pass through heat exchanger 30.

Optional heat exchanger 30 is used where reactor 40 is to be run at a temperature above or below that which the reaction mixture components have been kept prior to being introduced into reactor 40. For example, where the first section of reactor 40 is maintained at or near a temperature of 50° C., the reaction mixture preferably enters the first section of reactor 40 at or near 50° C. Where the reaction mixture components are individually maintained near room temperature (e.g., approximately 25° C.), optional heat exchanger 30 can be a preheater that raises the temperature of the combined reaction mixture components (i.e., the reaction mixture) to approximately that of the first section of reactor 40.

Reactor 40 can be surrounded by a jacket containing a circulating heat transfer fluid (e.g., water, steam, liquid nitrogen, etc.) which serves as the means to remove heat from or add heat to reactor 40 and the contents thereof. To aid in this temperature control, temperature sensing devices (e.g., thermometers and/or thermocouples) can extend into reactor 40 so as to measure the temperature of the reaction mixture passing thereby. Based on the output of the temperature sensing devices, the temperature and circulation rate of the heat transfer fluid contained in the jacket can be adjusted manually or automatically (e.g., by means of a computer controlled mechanism).

Additionally, at least a portion of reactor 40 can be enclosed by a shroud. Between the exterior of reactor 40 and the shroud is maintained an environment that effectively prevents ignition of any flammable or combustible materials that might be present in or near reaction system 10. Use of such a shroud (and the environment permitted thereby) allows general purpose electrical devices (e.g., standard heaters and motors) to be used in or with reaction system 10. Such general purpose devices often are more conducive to maintaining a temperature profile or producing essentially plug flow than are devices with higher safety ratings. Shrouded reactors are more fully described in assignee's copending U.S. patent application Ser. No. 08/638,432 (Attorney Docket No. 52508U.S.A.6A), pending which discription is incorporated herein by reference.

By dividing reactor 40 into sections and individually controlling the temperature of each section, the reaction mixture can be made to encounter a temperature profile. For example, each section of reactor 40 can be maintained at the same (or nearly the same) set temperature, thus ensuring that the reaction mixture encounters a steady temperature profile. Cyclic temperature profiles also are possible. Alternatively, each successive section of reactor 40 can be maintained at a temperature higher (or lower) that the previous section, thus ensuring that the reaction mixture encounters a rising (or falling) temperature profile. Because rate and degree of polymerization depend in part on temperature, the properties of the polymer product can be tailored simply by modifying the temperature profile that the reaction mixture encounters.

If desired, during the course of an ongoing polymerization, the temperature profile can be changed by changing the temperature of one or more sections. Changing the temperature profile is one way to change the targeted I.V., as discussed previously.

In addition to temperature control, an essential feature of reactor 40 is the capability to impel, from the input end of reactor 40 to its output end, in an essentially plug flow manner a reaction mixture contained therein. By "essentially plug flow" is meant that eddies and dead spots, where reaction mixture can be delayed in its path through reactor 40, and short circuits to the reactor outlet, which allow the reaction mixture to pass too quickly through reactor 40, are virtually nonexistent. This means that a given segment of a reaction mixture continues down the length of reactor 40 with about the same velocity profile as a segment traveling therethrough either earlier or later. STRs, extruders, and static mixers all are capable of essentially plug flow. The manner in which a reaction mixture is impelled through reactor 40 can be by an external means such as a pressure feed (e.g., a pump) or by an internal means (e.g., a screw in an extruder). Plug flow can be assisted by lateral mixing means (e.g., radial paddles in an STR).

The process of the present invention allows for the production of a poly($\alpha$-olefin) having a targeted I.V. ($\pm 0.2$ dL/g) within about five residence times of the reactor, preferably within about four residence times of the reactor, more preferably within about three residence times of the reactor, most preferably within about two residence times of the reactor. If, during a particular polymerization, one wishes to change the targeted I.V., the process of the present invention allows for a poly($\alpha$-olefin) with the changed targeted I.V. to be made ($\pm 0.2$ dL/g) within five residence times, preferably four residence times, more preferably three residence times of the reactor, most preferably two residence times of the reactor, measured from the time the targeted I.V. was changed.

If desired, the I.V. and composition of the polymer product can be measured in real time using devices such as, for example, an on-line refractometer or viscometer. (Although refractometers do not directly measure I.V., their outputs can be used to determine percent conversion, which can be used to determine I.V. once the solution viscosity of the polymer product has been determined.)

A preferred embodiment of reactor 40 is a stirred tubular reactor (STR), which consists of a series of cylinders joined together so as to form a tube. Down the center of this tube, a shaft having a plurality of paddles radiating therefrom extends along the primary axis of the tube. (Each cylinder can be jacketed as described previously.) As an external drive causes the shaft to rotate, the paddles stir the reaction mixture and assist in heat transfer. In addition, the paddles can be designed such that they assist the pumps and/or pressure head feed systems in propelling the reaction mixture through the tube. The design of STRs are known to those of skill in the art.

The tube can have a volume ranging from a fraction of a liter to several hundred liters or more depending on the number and radii of the cylinders used. The cylinders can be made of glass, tempered glass, various stainless steels, glass-lined steel, or any other material that is nonreactive with a reaction mixture passing therethrough, can exclude potential catalyst deactivating materials (e.g., atmospheric $O_2$ and $H_2O$) from the interior reaction zone, can transfer heat, and can withstand elevated pressure. Preferred materials include 316 L stainless steel and low coefficient of expansion-type glass (e.g., Pyrex™ glass, available from Corning Glass Works; Corning, N.Y.). The cylinders can be joined by means of various types of gaskets and flanges. Although the tube can be horizontal or angled, it preferably is angled upward from its input end to its output end so as to ensure that any inert gas in the STR can escape through the outlet.

The shaft can be made from a variety of inert metals, preferably stainless steel. Where a ZN catalyst system is to be used in the STR, the shaft preferably is made from a corrosion resistant stainless steel (e.g., 316 L stainless steel). This is because certain ZN catalyst materials (e.g., TiCl$_4$) can create HCl during use.

Where the shaft is hollow, it can be cooled (if desired). This can be accomplished by running a heat transfer fluid such as water through it.

To assist in maintaining essentially plug flow through an STR, the paddles can be designed so as to minimize reaction mixture build-up on the paddles and shaft. Build-up often occurs in stagnant regions, which are normally located on the walls of the tube or on the downstream surfaces of paddles, and can result in reduced heat transfer and plugging of the STR. Because STRs are cleaned less frequently than batch reactors (and because long term continuous operation is desirable), build-up can result in a loss of residence time. Ridding an STR of build-up can result in a loss of production time, the introduction of solvents into the STR can deactivate catalyst during future runs, etc. Build-up and the problems resulting therefrom can be minimized by proper paddle design.

Optimization of paddle design can involve the use of cylindrical and/or streamlined designs as well as providing for narrower wall clearances toward the outer end of the STR. (See the Examples section for a description of a preferred type of paddle configuration.) Use of paddles with flexible tips (e.g., made from an elastomer such as polytetrafluoroethylene) can assist in scraping the walls of the tube. Alternatively, build-up can be minimized by periodically alternating the direction of paddle rotation. Direction can be alternated every few seconds or minutes (or whatever time frame seems to best inhibit build-up with a particular reaction mixture).

Depending on the viscosities and MWs of the various materials contained therein, STRs can convert up to about 100% of monomers in a reaction mixture to polymer. Those polymers that are typically useful in PSA formulations can be made at conversions up to about 35%. Therefore, if an STR is used by itself as reactor 40, a means to recycle unreacted monomer is preferably included (see also discussion infra). Preferably, monomer(s) and any solvents present in the reaction mixture have boiling points that differ significantly. This can assist in separating the monomer(s) from the solvent so that neat monomer(s) can be recycled back to purification unit 14. Actual separation of monomer(s) from any solvent and/or quench solution (see discussion infra) can be accomplished by a variety of distillation methods. Recaptured solvent can be recycled or disposed of, as desired.

Where a polymer with mer units derived from a gaseous monomer (e.g., ethylene, propylene, or butene) is desired, the gaseous comonomer is introduced near the inlet for the other reaction mixture components. Elevated feed pressure is desirable to ensure good solubility of the gaseous comonomer in the liquid monomer. Nevertheless, an arrangement where the liquid reaction mixture fills only the majority of the STR—leaving a gaseous over-layer—is possible as long as the paddles are designed such that they repeatedly wipe up a liquid film into the gaseous over-layer. Where a gaseous monomer is used, the tube of STR preferably is made from a very strong material (e.g., stainless steel) so as to withstand the elevated pressure necessary to assure solubility of the gaseous monomer.

Another preferred embodiment of reactor 40 is an extruder. Extruders are broadly classified as single screw and multi-screw, with twin screw being the dominant version of the latter. Multi-screw extruders can be further classified according to the relative direction of the screws, i.e., counter-rotating (where the screws rotate in opposite directions) and co-rotating (where the screws turn in the same direction). Counter-rotating twin-screw extruders can be further subclassified according to the manner in which the flights (i.e., the grooves) of the two extruders interact. In "intermeshing" units, the flights of one extruder alternate with those of the other in such a manner that very little of the material in one flight can mix with that in the other, whereas, in "tangential" units, the flights of the two screws are aligned (i.e., matched) or staggered so as to provide for increased volume and longer reaction times. Regardless of the number of screws, the direction that they turn, or the arrangement of the flights therein, any extruder design that allows for essentially plug flow of the reaction mixture can be used as reactor 40; nevertheless, a counter-rotating twin-screw extruder has been found to provide for the closest approximation to a plug flow and is, accordingly, the preferred type of extruder.

Extruders are commonly available in a variety of sizes, with screw diameters ranging up to about 135 min. (Even larger versions might be available on a special order basis.) Modular units also are available. The length of the extruder barrel preferably is of sufficient length to allow for significant conversion to polymer. In practice, a length-to-diameter ratio of 60:1 (with a screw speed of 50 rpm, which can provide a residence time of about 8.5 minutes) has been found to allow for approximately 95% conversion at 50° C. at about 40–45 ppm Ti catalyst and for approximately 95% conversion at 100° C. at about 10 ppm Ti catalyst.

Typically, extruder barrels and screws are made from metal alloys (e.g., high chrome steel alloy) with a variety of hardness levels and resistances to corrosion available. Usually the screw(s) is/are made from an alloy that is slightly softer than that used in the barrel. Where the screw(s) is/are hollow, a cooling solution (e.g., chilled water or chilled acetone) can be pumped therethrough to assist in heat transfer out of the reaction mixture (i.e., the screw itself can be cooled).

The screw(s) is/are typically driven by one or more motors. The motor(s) and the oil pump for the transmission preferably are manufactured so as to be explosion proof, are located away from the extruder in a purged cabinet, or are used in the shrouded system discussed previously.

Where a modular extruder unit is used, the screw configuration can be customized simply by joining various sections. In practice, this has been found to be advantageous. For example, at the inlet end of the extruder, large flight advance elements (i.e., a fast pitch) can be used as the large space between flights aids in keeping the flights clean. Near the outlet end of the extruder, a slow pitch can be used to limit the speed at which reaction mixture proceeds through the extruder. To increase the free volume of an extruder (and to increase residence time), a section with a counterflight screw design can be used. Such sections can be alternated with "regular" flight sections to give good pumping while increasing the amount of reaction mixture in the extruder at any given time. Substantially equivalent combinations will be readily apparent to those skilled in the art.

Additionally, where a modular design is used, temperature control of each of the sections is available. By pumping a heat transfer fluid (e.g., chilled water) through the jacket of each section (and controlled by a solenoid), effective heat transfer is possible. The temperature of the fluid can be controlled by an automatic electric heating devices.

Because the monomer-cocatalyst-catalyst mixture introduced into the input end of an extruder is not sufficiently viscous to keep from slipping past the screw, a pressure feed is used. This is accomplished with aforementioned pumps 16, 16a, and 16b or with a simple pressurized feed tank. Where an extruder is used as the second half of an STR-extruder combination (see discussion below), reaction mixture exiting the STR is sufficiently viscous to not require being pressurized.

Near the end of the extruder, preferably at or beyond the point where the percent conversion of monomer to polymer has reached 95% (e.g., just before the slow-pitch screw segment), a port can be included in the barrel so as to allow a vacuum to be applied to the interior of the extruder. Under this port, a multiple start screw segment, preferably a triple start screw segment, is used so as to minimize the amount of reaction mixture in a given flight (i.e., to prevent polymer product from plugging the vacuum port(s)). This type of vacuum can assist in removing unreacted monomer from the reaction mixture.

At the input of the extruder or at some point downstream from the input end but prior to the vacuum port or slow pitch screw segment, other inlet ports can be included in the barrel of the extruder. Through these inlets can be introduced one or more copolymerizable monomers (either liquid or gas) and/or adjuvants such as calcium stearate, which can assist in scavenging any HCl produced during the polymerization process. (The use of gaseous comonomers is discussed in more detail it infra.)

By varying the speed of the extruder screw(s), a variety of residence times can be achieved. For an extruder having a volume of 3 L, residence times can vary from about 60 seconds (at screw speeds of 400 rpm) to about 45 minutes (at screw speeds of 10 rpm). (The broad range of times just specified can be raised or lowered by those skilled in the art through manipulation of internal volume.) In the former case, conversion to polymer typically will be less than about 20% whereas, in the latter case, conversion will be nearly 100%. In practice, an interim speed (e.g., 50 rpm) normally is used so as to obtain a residence time between about five and ten minutes.

The range of possible I.V.'s for polymers made in an extruder can extend from 0.6 to about 4.5 dL/g, although polymers with I.V.'s in the range of about 1 to about 4 dL/g are easier to make and process. A particular I.V. within this range is obtained by judicious selection of temperature and identity and/or concentration of catalyst system components, which capability is well within that possessed by one of ordinary skill in the art.

Where a gaseous comonomer is used, it preferably is introduced into the extruder near the entry port for the liquid monomer. However, the gaseous monomer feed preferably is not begun until after some of the liquid monomer has been introduced and allowed to react to form a "polymer plug", which acts to keep the gaseous monomer from venting out the outlet or the vacuum port. The partial pressure of the gaseous monomer within the extruder is maintained at a level sufficiently high to keep the gaseous monomer soluble in the liquid monomer. In the polymer product, mer units derived from one or more gaseous monomers can range up to about 30%, although even higher percentages of mer units derived from gaseous monomers are believed to be possible in an optimized system. Preferred gaseous monomers include ethylene and propylene.

In an extruder, the quench solution or compound (if used) is added near the end of the screw(s), preferably just before the vacuum port if one is used. Traditional quenching agents can be used. These include water, alcohols, ketones, amines, etc. However, certain materials that traditionally have been used as stabilizers (e.g., hindered phenols) have been found to be efficient quench materials as well. In addition to being able to deactivate the catalyst sites, the quench material preferably is soluble in the reaction mixture (due to the fact that the catalyst sites are in the reaction mixture).

Yet another preferred embodiment of reactor 40 is a combination system where the output of an STR is pumped into the front end of an extruder. Such a combination system can take the moderately converted reaction mixture exiting an STR and allow for further conversion in an extruder. Because the reaction mixture being fed into the extruder is already fairly viscous, the need for a pressurized feed (discussed previously with respect to extruders) is eliminated. In a combination system, the STR output is fed to the extruder through a heated line, preferably one that is very short (e.g., up to about three feet).

Catalyst levels used in an STR typically are lower than those used in an extruder because of the lower conversion levels generally achieved in STRs. Therefore, additional catalyst system components preferably are added to the reaction mixture prior to its entry into the extruder. This allows for very high conversions.

Regardless of the exact form of reactor 40, the material exiting the output end thereof is fairly viscous (i.e., between about 20,000 and several million centipoise). Depending on the number of processing steps desired, a pump can assist in propelling the exiting reaction mixture. In practice, progressive cavity and/or gear pumps have been found to work well for this purpose.

Although not as preferred as an STR or an extruder, a static mixer can be used as reactor 40. Static mixers comprise a tube, similar to that used in an STR, with a serious of twisted, stationary blades mounted at various angles throughout the length of the tube. Each section of blades splits and rotates the reaction mixture passing thereby. When using a ZN catalyst system in a static mixer, care must be taken to ensure that the catalyst slurry does not settle at the inlet. If that happens, polymerization can occur too quickly, thus plugging the entrance to the static mixer.

STRs, extruders, and static mixers have been mentioned as examples of useful designs for reactor 40. They are meant to be merely illustrative. Other designs with insubstantial differences (e.g., those that allow for essentially plug flow and temperature control) are within the scope of the present invention when used as reactor 40.

As discussed previously, the target I.V. of the polymer can be changed during a particular polymerization. Should a new target I.V. become desirable during a polymerization run, the process of the present invention allows such a change to be realized within a relatively short amount of time. In addition to the aforementioned change in temperature profile, changes in the identity of one or more catalyst system components or in the amount(s) of the catalyst system component(s) can change the I.V. of the polymer product. For example, by increasing the amount of cocatalyst in a ZN catalyst system during a given polymerization, the I.V. of the polymer product can be decreased to a lower targeted I.V. This lower I.V. material will be within 0.2 dL/g, preferably 0.15 dL/g, more preferably 0.1 dL/g, most preferably 0.05 dL/g of the new targeted I.V. within five residence times of the reactor.

D. Quench

Where either a static mixer or an STR is used alone as reactor 40, a quench solution is added to the reaction mixture soon after it exits reactor 40. (Quenching in an extruder was discussed previously.) This can be accomplished by blending the reaction mixture and quench feeds through a simple T-pipe arrangement. To ensure thorough mixing of the two feeds, the combined feed can be fed into another mixer (e.g., a static mixer).

Those skilled in the art are aware of the wide variety of materials that can be used to quench various catalyst systems. Commonly used examples include oxygen, water, steam, alcohols, ketones, esters, amines, hindered phenols, etc. Where a colorless polymer is desired, oxygen or an isopropanol-water solution can be particularly useful. The ratio of isopropanol to water normally is in the range of 90:10 to 95:5.

Use of a quench generally is unnecessary where the polymer or the reaction mixture is to be used immediately as it exits reactor 40.

E. Thermal stabilizer

Where the polymer and/or the reaction mixture is to be processed at elevated temperatures (e.g., high temperature devolatilization of the reaction mixture or hot-melt coating of the polymer), addition of a thermal stabilizer to the reaction mixture is preferred. A variety of thermal stabilizers, including hindered phenols and phosphites, are widely used in the industry. Whichever stabilizer is used preferably is soluble in the monomer and polymer; otherwise, a solvent will be necessary as a delivery mechanism.

In the instance where a hindered phenol has been used as the quench, addition of a separate thermal stabilizer can be unnecessary.

F. Devolatilization

Where the polymer product is to be used in pure form (i.e., not mixed with monomer), unreacted monomer can to be stripped out of the reaction mixture by devolatization mechanism 50. (Of course, where an extruder with the aforementioned vacuum port(s) is used, a separate devolatilization step is unnecessary.) A variety of known devolatilization processes are possible. These include, but are not limited to, vacuum tray drying on, for example, silicone-lined sheets; wiped film and thin film evaporators (where the I.V. of the polymer is not too high); steam stripping; extrusion through a spinneret; and air drying.

A preferred type of devolatilization mechanism 50 is a Discotherm B™ high viscosity processor (List AG; Acton, Mass.). Other manufacturers such as Krauss-Maffei Corp. (Florence, Ky.) and Hosokawa-Bepex (Minneapolis, Minn.) make similar processors. These types of processors have been found to be efficient in separating polymer product from the remainder of the quenched reaction mixture. If desired, such processors can be maintained at below ambient pressures so that reduced temperatures can be used. Use of reduced pressures permit the recapture of very volatile components without extensive degradation of the polymer.

The remaining components of the reaction mixture (i.e., monomer(s), solvent(s), and any quench solution that was used) can be disposed of or recycled. The latter option requires that, once condensed, they be separated from each other. This commonly is done by means of distillation; thus, the use of monomer(s) with boiling points that differ significantly from those of the solvent(s) and/or quench solution is preferred. Recycled monomer passes through purification unit 14 prior to being reintroduced into reactor 40.

G. Collection of polymer

Once the polymer product has been isolated from the remainder of the reaction mixture, it can be collected directly from outlet 60 in a desired container. Low I.V. polymers can be collected in drums, whereas higher I.V. polymers can be collected in silicone-lined boxes. (Higher I.V. materials tend to harden into blocks once cooled to ambient temperatures.)

Objects and advantages of this invention are further illustrated by the following examples. The particular materials and amounts thereof, as well as other conditions and details, recited in these examples should not be used to unduly limit this invention.

EXAMPLES

In the following examples, either 1-hexene or 1-octene (Albemarle Corp.; Houston, Tex., now available from AMOCO Corp.; Chicago, Ill.) was nitrogen sparged until $[O_2]<1$ ppm. Deoxygenated monomer was pumped through a molecular sieve column containing 13× molecular sieve beads (Grace Davidson; Baltimore, Md., a division of W. R. Grace & Co.) until $[H_2O]<1$ ppm. The purified monomer was then fed (a) directly to the reactor when a stirred tubular reactor (STR) was used, or (b) to a feed tank when an extruder was used. (In the latter case, purified monomer was pressure fed from the feed tank to the extruder through a 33 cm long (5.1 cm inside diameter) column containing activated alumina (Fisher Scientific; Pittsburgh, Pa.) and Grade 408 silica gel activated desiccant (Davidson Chemicals; Baltimore, Md.) in a ratio of 25:75 to assure that the oxygen and water concentrations were less than 1 ppm.)

In each example, I.V. measurements are summed and divided by the number of data points to give a mean I.V. The standard deviation (SD) of the data points was calculated using the formula $$SD=[\Sigma(X_i-X_a)^2/(n-1)]^{1/2}$$

where $X_i$ is an individual I.V. measurement, $X_a$ is the mean I.V., and n is the number of data points. Because SD is underestimated by this formula where n is less than 20, a confidence limit (CL) for those examples with fewer than 20 data points was calculated using the formula $$CL=X_a\pm[t(SD)/(n)^{1/2}]$$

where $X_a$, SD, and n are defined as above and t is the appropriate Student's t value for a given $\alpha$ where $1-2\alpha$ is the probability level.

Three reactors were used in the following examples. They were a 10 L capacity STR, a 20 L capacity STR, and an extruder. Although those skilled in the art are familiar with the design and operation of STRs and extruders, detailed explanations of the particular models used in the following examples are given for the sake of clarity.

A. 10 L STR

The 10 L capacity STR consisted of five approximately equal Pyrex™ cylinders, each with an outside diameter of 7.62 cm, an inside diameter of 6.99 cm, and a length of 57.2 cm. These were joined together with bored, grooved stainless steel disks. The STR was closed off at both ends with stainless steel disks, and the cylindrical sections were enclosed with polycarbonate jackets (0.32 cm thick, 52.1 cm long) equipped with individual temperature sensing devices extending into the interior of the cylindrical sections. These temperature sensing devices permitted the temperature of the reaction mixture in each section to be monitored and adjusted up or down (as necessary) to a set point by varying the amount of steam and/or water flowing into the jacketed sections.

Extending through the center of the joined cylinders was a 1.27 cm diameter stainless steel shaft suspended along the cylinder axis by three shaft alignment pins extending from each of the end caps and attached to a circular bushing surrounding the shaft in the plane of each bored end cap. To the shaft was affixed, via set screws, 43 detachable stainless steel paddles with approximately 3.2 cm between each paddle. The paddies consisted of cylinders with a 1.27 cm hole cut through the center of the cylinder perpendicular to the cylinder axis, rectangles with the long end perpendicular to the shaft axis and bent so that the center of the rectangle was wrapped halfway around the shaft, or similarly bent rectangles with smaller windows cut from each end. The cylindrical paddles were 1.9 cm in diameter and 2.5 cm long thus providing a clearance from the inner wall of the glass cylinder of approximately 10.0 cm. The rectangular paddles were 1.9 mm thick and 4.1 cm wide and 4.8 cm long in reactor sections 1 and 2 (with a resulting clearance of 1.4 cm) or 5.1 cm wide and 5.7 cm long in reactor sections 3 and 4 (with a resulting clearance of 0.6 cm). The rectangular paddles with windows were 5.1 cm wide and 5.7 cm long (with a resulting clearance of 0.6 cm). Rectangular paddles with a length of 5.7 cm and width varying between 1.3 cm and 2.5 cm were used near the bored end caps to avoid collision with the. The paddle configuration used was as follows: in section 1, six cylindrical paddles followed by four rectangular paddles; in section 2, eight rectangular paddles; in section 3, nine rectangular paddles; in section 4, four rectangular paddles followed by four rectangular paddles with windows; and in section 5, one rectangular paddle followed by seven rectangular paddles with windows.

The shaft was attached to a 2.2 kW variable speed motor and driven at approximately 250 rpm. The direction of the shaft reversed about every minute.

B. 20 L Capacity STR

The construction of the 20 L capacity STR was similar to the 10 L capacity STR with minor exceptions. Each section had an outside diameter of 10.2 cm and an inside diameter of 8.9 cm. The polycarbonate jacket surrounding each section was 0.64 cm thick. A total of 45 paddles were used with a space between paddles ranging from 1.9 cm in section 1, to 2.5 cm in sections 2 and 3, to 3.2 cm in sections 4 and 5. The paddle dimensions also were different. The cylindrical paddles were 1.9 cm in diameter and 7.0 cm long, the providing a clearance from the inner wall of the glass cylinder of approximately 1.0 cm. The rectangular paddles were 1.9 mm thick and 4.1 cm wide and 7.0 cm long in sections 1, 2, and 3 (with a resulting clearance of 1.0 cm). The rectangular paddles with windows had windows 3.8 cm wide and 2.5 cm long, were also 1.9 mm thick, and were 5.1 cm wide and 8.7 cm long (with a resulting clearance of 0.1 cm). Rectangular paddles with a length of 7.0 cm and a width 2.9 cm were used near the bored end caps to avoid collision with the shaft alignment pins.

The paddle configuration used was as follows: in section 1, ten cylindrical paddles followed by three rectangular paddles; in section 2, nine rectangular paddles; in section 3, nine rectangular paddles; in section 4, seven rectangular paddles with windows; and, in section 5, seven rectangular paddles with windows.

C. Extruder

The extruder used was a modular (16 section) intermeshing, counter rotating, twin-screw model (Leistritz AG; Nuremberg, Germany) fitted with a $N_2$-purged plenum.

Intermeshing screw elements on two shafts were configured with fast pitch elements at the beginning of the shafts which tapered to slow pitch elements thereafter. In cases where addition of adjuvants (such as a quenching solution, antioxidants, and the like) was desirable, the screw configuration at the addition point used faster pitch elements to permit volume additions. In cases where it was desirable to remove monomers or other volatile components from the reaction product, the screw configuration at the removal point used triple start screw elements to reduce the reaction mixture volume in the slots of the screws so the reaction mixture would not plug the vacuum ports placed over the triple start screw elements to move the volatile components.

The diameter of the screw was 50 mm with a length-to-diameter ratio of 60. The screws were made from a high alloy, chrome-hardened steel and fitted into water-cooled barrels made from a high alloy, nitrided steel.

Example 1

A catalyst—cocatalyst solution was prepared from 0.75 g [1,2-bis(9-fluorenyl-ethylene)]$ZrCl_2$ (using the method of H. G. Alt et al., *J. Organometal. Chem.*, 472, 113 (1994)) in 93.3 mL methylaluminoxane (Albemarle Chem. Co.; Baton Rouge, La.) and stirred at room temperature for about 30 minutes. This solution was diluted with 1 L dry, $O_2$-free toluene.

Purified 1-octene was preheated to approximately 55° C. Heated monomer (at a rate of 234.0 g/min) and the toluene-diluted catalyst—cocatalyst solution (at 308 kPa pressure and a rate of 5.2 g/min) were pumped into the 10 L capacity STR. A color change was observed when the catalyst—cocatalyst solution contacted the monomer.

The temperature of the reaction mixture in each of the five reactor sections was maintained at about 55° C. Residence time of the reaction mixture in the STR was about 30 minutes. As the reaction mixture exited the STR, it was combined with a 95:5 isopropanol—deionized water quench solution flowing through a T-pipe connector at a rate of 8 g/min.

The quenched mixture (i.e., reaction mixture combined with quench solution) was passed into a 46 cm Kenics™ Static Mixer (Chemineer, Inc.; North Andover, Mass.) with 1.9 cm stainless steel static mixing elements (i.e., an interlocking segment that channels fluid in a spiral path) so as to thoroughly mix the two components and deactivate any remaining active catalyst.

The reaction continued for about 180 minutes. Samples of the quenched mixture were taken periodically beginning 40 minutes after reaction product first began to exit the static mixer.

Volatile components (e.g., unreacted monomer and quench solution) were removed by placing each sample in a vacuum oven, set at a temperature of approximately 65° C. and a pressure of approximately 10 mm Hg, for about 60 minutes. The I.V. of the polyoctene was determined in a Size 50 Cannon-Fenske Solution Viscometer (Cole-Parmer Instrument Co.; Niles, Ill.), using a 0.1 g/dL solution of polymer in toluene at 25° C. The data from these measurements are shown in Table 1.

TABLE 1

| Time (min) | 40 | 46 | 70 | 93 | 123 | 155 | 180 |
|---|---|---|---|---|---|---|---|
| I.V. (dL/g) | 0.65 | 0.58 | 0.55 | 0.62 | 0.54 | 0.53 | 0.57 |

The mean I.V. was 0.58±0.04 dL/g (95% confidence) with a standard deviation of 0.04. This shows that the I.V. of polyoctene made in an STR with a metallocene catalyst can be kept fairly stable over time when the reaction mixture temperature is kept relatively constant.

Example 2

Polyoctene was prepared according to the procedure of Example 1 with some modifications.

A 41:1000 (this and all other ratios are w/w unless a contrary indication is present) mixture of a 25% solids solution of triethylaluminum (AlEt$_3$) in heptane (Albemarle Corp.) in purified 1-octene was used as the cocatalyst, and a 2.3:10,000 mixture of MgCl$_2$-supported TiCl$_4$ Lynx™ 715 catalyst powder (Catalyst Resources Inc.) in purified 1-octene was used as the catalyst suspension.

Monomer (at a rate of 197.5 g/min) and cocatalyst solution (at a rate of 13.4 g/min) were merged through a T-pipe connector, preheated to approximately 70° C., and pressure fed into the 10 L capacity STR. The catalyst suspension, continuously stirred under N$_2$ to prevent stratification and oxygen contamination, was introduced by peristaltic pump at a rate of 27.41 g/min into the 10 L capacity STR.

The temperature of the reaction mixture in each section of the STR was maintained at approximately 70° C. The reaction was continued for 240 minutes. Samples of the quenched reaction mixture were taken every 30 minutes beginning 60 minutes after the onset of reaction.

For each sample, volatile components were removed, and the I.V. of the polymer was determined. Results are shown in Table 2.

TABLE 2

| Time (min) | 60 | 90 | 120 | 150 | 180 | 210 |
|---|---|---|---|---|---|---|
| I.V. (dL/g) | 0.97 | 0.77 | 0.76 | 0.97 | 1.06 | 1.14 |

The mean I.V. was 0.95±0.16 dL/g (95% confidence) with a standard deviation of 0.15. This shows that the I.V. of a low MW polyoctene made in an STR with a supported ZN catalyst can be kept fairly stable over time when the reaction mixture temperature is kept relatively constant.

Example 3

Polyoctene was prepared in a 20 L capacity STR according to the procedure of Example 2 with some modifications.

Purified 1-octene was fed at a rate of 435.9 g/min. The cocatalyst solution was AlEt$_3$-heptane and 1-octene in a ratio of 38:1000. The catalyst suspension was Lynx™ 715 catalyst and purified 1-octene in a ratio of 5.9:10,000, which was fed into the STR at a rate of 25.3 g/min. Samples of the quenched reaction mixture were taken every 30 minutes beginning 80 minutes after the onset of reaction.

For each sample, volatile components were removed, and the I.V. of the polymer was determined. Results are shown in Table 3.

TABLE 3

| Time (min) | 80 | 110 | 140 | 170 | 200 | 230 |
|---|---|---|---|---|---|---|
| I.V. (dL/g) | 1.44 | 1.33 | 1.23 | 1.28 | 1.27 | 1.24 |

The mean I.V. was 1.30±0.08 dL/g (95% confidence) with a standard deviation of 0.08. This shows that the I.V. of polyoctene made in an STR with a supported ZN catalyst can be kept fairly stable over time when the reaction mixture temperature is kept relatively constant.

Example 4

Polyhexene was prepared according to the procedure of Example 3 with some modifications, including the substitution of 1-hexene for 1-octene.

The cocatalyst solution was a 73:100 mixture of a 25% AlEt$_3$-heptane in purified 1-hexene. The catalyst suspension was a 123.3:10,000 mixture of a 123.3:10,000 mixture of Lynx™ 900, a 19.6% solids slurry of unsupported TiCl$_3$ in hexane (Catalyst Resources Inc.) and additional hexane.

Purified 1-hexene (at a rate of 416.6 g/min), cocatalyst solution (at a rate of 6.31 g/min), and catalyst suspension (at a rate of 29.30 g/min) were fed into the STR. The preheat temperature and the five zone temperatures were all maintained at approximately 55° C. The reaction was continued for about 96 hours. The quenched reaction mixture was collected in 18 containers, and a sample was taken from each container.

For each sample, volatile components were removed, and the I.V. of the polymer was measured. The results are shown in Table 4.

TABLE 4

| Sample No. | I.V. (dL/g) |
|---|---|
| 1 | 2.45 |
| 2 | 2.48 |
| 3 | 2.36 |
| 4 | 2.35 |
| 5 | 2.29 |
| 6 | 2.38 |
| 7 | 2.31 |
| 8 | 2.31 |
| 9 | 2.34 |
| 10 | 2.37 |
| 11 | 2.38 |
| 12 | 2.39 |
| 13 | 2.38 |
| 14 | 2.37 |
| 15 | 2.37 |
| 16 | 2.37 |
| 17 | 2.39 |
| 18 | 2.38 |

The mean I.V. was 2.37±0.02 dL/g (95% confidence) with a standard deviation of 0.05. This shows that the I.V. of polyhexene made in an STR with an unsupported ZN catalyst can be kept fairly stable over time when the reaction mixture temperature is kept relatively constant.

Example 5

Polyoctene was prepared according to the procedure of Example 3 with minor modifications.

The cocatalyst solution was AlEt$_3$-heptane and purified 1-octene in a ratio of 247:1000, and the catalyst suspension was Lynx™ 900 catalyst and hexane in a ratio of 73.1:10,000.

Purified 1-octene (at a rate of 443.9 g/min), cocatalyst solution (at a rate of 5.36 g/min), and catalyst suspension (at a rate of 25.30 g/min) were fed to the STR. The reaction was continued for 120 hours. The quenched reaction mixture was collected in 23 containers, and a sample was taken from each container.

For each sample, volatile components were removed, and the I.V. of the polymer was measured. Results are shown in Table 5.

TABLE 5

| Sample No. | I.V. (dL/g) |
|---|---|
| 1 | 2.62 |
| 2 | 2.48 |
| 3 | 2.63 |
| 4 | 2.64 |

TABLE 5-continued

| Sample No. | I.V. (dL/g) |
|---|---|
| 5 | 2.59 |
| 6 | 2.55 |
| 7 | 2.48 |
| 8 | 2.43 |
| 9 | 2.59 |
| 10 | 2.65 |
| 11 | 2.47 |
| 12 | 2.52 |
| 13 | 2.55 |
| 14 | 2.53 |
| 15 | 2.57 |
| 16 | 2.52 |
| 17 | 2.49 |
| 18 | 2.49 |
| 19 | 2.54 |
| 20 | 2.64 |
| 21 | 2.47 |
| 22 | 2.47 |
| 23 | 2.55 |

The mean I.V. was 2.54 dL/g with a standard deviation of 0.06. This shows that the I.V. of polyoctene made in an STR with an unsupported ZN catalyst can be kept fairly stable over time when the reaction mixture temperature is kept relatively constant.

Example 6

Polyoctene was prepared according to the procedure of Example 5 with some modifications.

The ratio of AlEt$_3$-heptane to purified 1-octene in the cocatalyst stream was 86:1000, and the ratio of Lynx™ 900 catalyst to hexane in the catalyst mixture was 62.6:10,000. Purified 1-octene was fed at a rate of 435.9 g/min, and cocatalyst solution was fed at a rate of 8.63 g/min. The preheat temperature was 40° C., and the temperature of the STR sections were as follows: #1=40° C., #2=50° C., #3=60° C., #4=70° C., and #5=70° C.

The reaction was continued for 250 minutes, and six samples of the quenched reaction mixture were taken at thirty minute intervals.

For each sample, volatile components were removed, and the I.V. of the polymer was measured. The results are shown in Table 6.

TABLE 6

| Time (min) | 100 | 130 | 160 | 190 | 220 | 250 |
|---|---|---|---|---|---|---|
| I.V. (dL/g) | 3.10 | 3.15 | 2.98 | 3.14 | 3.06 | 3.04 |

The mean I.V. was 3.08±0.07 dL/g (95% confidence) with a standard deviation of 0.06. This shows that the I.V. of polyoctene made in an STR with an unsupported ZN catalyst can be kept fairly stable over time when the reaction mixture temperature increased in a uniform, controlled manner (here, from 40° to 70° C.).

Example 7

Polyoctene was prepared according to the procedure of Example 5 with some modifications.

The cocatalyst solution was AlEt$_3$-heptane and purified 1-octene in a ratio of 22:1000, and the catalyst suspension was Lynx™ 900 catalyst and hexane in a ratio of 56.3:10,000. Purified 1-octene was fed at a rate of 435.9 g/min, and cocatalyst solution was fed at a rate of 13.41 g/min.

The reaction was continued for 250 minutes, and eight samples were taken at different times beginning 53 minutes after the run began.

For each sample, volatile components were removed, and the I.V. of the remaining polymer was measured. The results are shown in Table 7.

TABLE 7

| Time (min) | I.V. (dL/g) |
|---|---|
| 53 | 3.37 |
| 83 | 3.40 |
| 113 | 3.29 |
| 143 | 3.51 |
| 173 | 3.44 |
| 203 | 3.41 |
| 233 | 3.51 |
| 248 | 3.48 |

The mean I.V. was 3.43±0.07 dL/g (95% confidence) with a standard deviation of 0.08. This shows that the I.V. of a relatively high MW polyoctene made in an STR with an unsupported ZN catalyst can be kept fairly stable over time when the reaction mixture temperature is kept relatively constant.

Example 8

Polyoctene was prepared according to the procedure of Example 2 with some modifications.

A cocatalyst solution of 25% solids AlEt$_3$-heptane and purified 1-octene was mixed in a ratio of 21:1000, and the catalyst suspension was Lynx™ 900 catalyst and hexane in a ratio of 58.4:10,000. The preheat temperature and the five zone temperatures were all approximately 40° C.

The reaction was continued for 280 minutes. Six samples of the quenched reaction mixture were taken at different times beginning 60 minutes after the onset of reaction.

For each sample, volatile components were removed, and the I.V. of the polymer was measured. The results are shown in Table 8.

TABLE 8

| Time (min) | 60 | 120 | 185 | 255 | 275 |
|---|---|---|---|---|---|
| I.V. (dL/g) | 4.85 | 4.78 | 4.62 | 4.70 | 4.55 |

The mean I.V. was 4.70±0.15 dL/g (95% confidence) with a standard deviation of 0.12. This shows that the I.V. of a high MW polyoctene made in an STR with an unsupported ZN catalyst can be kept fairly stable over time when the reaction mixture temperature is kept relatively constant.

Example 9

Polyoctene was prepared according to the procedure of Example 2 with certain modifications, including an extruder being used in place of a 10 L STR.

The cocatalyst solution was AlEt$_3$-heptane and purified 1-octene in a ratio of 12.9:1000, and the catalyst suspension was Lynx™ 715 catalyst and purified 1-octene in a ratio of 79.7:10,000. Purified 1-octene (at a rate of 138.8 g/min), cocatalyst solution (at a rate of 24.0 g/min), and catalyst suspension (at a rate of 41.9 g/min) were pressure fed, combined, and the resultant mixture fed directly into the first section of the extruder without preheating. The catalyst suspension was pumped to the first section using a peristaltic pump. Twin inlets were used such that the monomer—cocatalyst solution and the catalyst suspension met above the screw elements in that section.

The temperature of each zone of the extruder was set at approximately 45° C., and temperature probes in the extruder sections showed that the temperature of the reaction mixture was controlled at or near the set points. The extruder screw speed was set at 51 rpm, which gave an approximate residence time of 8.5 minutes. No quench solution was used.

The reaction was continued for 215 minutes, and samples were taken at various times beginning 85 minutes after the onset of reaction.

For each sample, volatile components were removed, and the I.V. of the polymer was measured. The results are shown in Table 9.

TABLE 9

| Time (min) | 85 | 119 | 153 | 188 |
|---|---|---|---|---|
| I.V. (dL/g) | 1.69 | 1.67 | 1.71 | 1.65 |

The mean I.V. was 1.68±0.04 dL/g (95% confidence) with a standard deviation of 0.03. This shows that the I.V. of polyoctene made in an extruder with a supported ZN catalyst can be kept fairly stable over time when the reaction mixture temperature is kept relatively constant.

Example 10

Polyoctene was prepared according to the procedure of Example 9 with minor modifications.

The cocatalyst solution was AlEt$_3$-heptane and purified 1-octene in a ratio of 2.3:1000, and the catalyst suspension was Lynx™ 715 catalyst and purified 1-octene in a ratio of 26.8:1,000. Purified 1-octene (at a rate of 25.6 g/min), cocatalyst solution (at a rate of 49.1 g/min), and catalyst suspension (at a rate of 48.1 g/min) were fed into the extruder.

The temperature of each section of the extruder was maintained at approximately 50° C., except section 14, which was maintained at 85° C., and section 15, which was maintained at 170° C. Near the end of the extruder, the screw configuration on the shafts comprised both fast pitch and slow pitch screw elements. A vacuum port was installed over the last section, and a gear pump was used to pump the extrudate.

Stabilizer solution, composed of Irganox™ 1076 antioxidant (Ciba-Geigy Corp.; Greensboro, N.C.) and purified 1-octene in a ratio of 137.3:1000, was fed at a rate of 5 g/min into the penultimate zone. Most of the volatile components were removed through the vacuum port.

The reaction was continued for 208 minutes, and samples were taken at various times beginning 49 minutes after the onset of reaction.

For each sample, remaining volatile components were removed, and the I.V. of the polymer was measured. The results are shown in Table 10.

TABLE 10

| Time (min) | 49 | 74 | 98 | 123 | 148 | 172 | 197 |
|---|---|---|---|---|---|---|---|
| I.V. (dL/g) | 2.73 | 2.73 | 2.95 | 2.95 | 3.07 | 3.04 | 3.10 |

The mean I.V. was 2.94±0.15 dL/g (95% confidence) with a standard deviation of 0.15. This shows that the I.V. of polyoctene made in an extruder with a supported ZN catalyst can be kept fairly stable over time when the reaction mixture temperature is kept relatively constant except for the last two zones.

Example 11

Polyhexene was prepared according to the procedure of Example 9 with minor modifications, including the use of 1-hexene instead of 1-octene as both the monomer feed and diluent for the cocatalyst solution and catalyst suspension.

The cocatalyst solution was AlEt$_3$-heptane and purified 1-hexene in a ratio of 10.2:1000, and the catalyst suspension was Lynx™ 715 catalyst and purified 1-hexene in a ratio of 62.8:10,000. Purified 1-hexene (at a rate of 92.5 g/min), cocatalyst solution (at a rate of 22.4 g/min), and catalyst suspension (at a rate of 39.3 g/min) were fed into the extruder.

The extruder screw speed was set at 40 rpm, which gave an approximate residence time of 10.7 minutes. The reaction was continued for 235 minutes, and samples were taken at various times beginning 21 minutes after the onset of reaction.

For each sample, volatile components were removed, and the I.V. of the remaining polymer was measured. The results are shown in Table 11.

TABLE 11

| Time (min) | I.V. (dL/g) |
|---|---|
| 21 | 1.60 |
| 32 | 1.63 |
| 43 | 1.69 |
| 53 | 1.71 |
| 64 | 1.66 |
| 85 | 1.63 |
| 107 | 1.57 |
| 128 | 1.53 |
| 149 | 1.52 |
| 170 | 1.51 |
| 193 | 1.50 |
| 213 | 1.48 |
| 234 | 1.47 |

The mean I.V. was 1.53±0.05 dL/g (95% confidence) with a standard deviation of 0.08. This shows that the I.V. of polyhexene made in an extruder with a supported ZN catalyst can be kept fairly stable over time when the reaction mixture temperature is kept relatively constant.

Example 12

Polyhexene was prepared according to the procedure of Example 11 with some modifications.

The cocatalyst solution was AlEt$_3$-heptane and purified 1-hexene in a ratio of 8.6:1000, and the catalyst suspension was Lynx™ 715 catalyst and purified 1-hexene in a ratio of 70.7:10,000. Purified 1-octene (at a rate 99.3 g/min), cocatalyst solution (at a rate of 19.9 g/min), and catalyst suspension (at a rate of 34.9 g/min) were fed into the extruder. The reaction was continued for 300 minutes, and samples were taken at various times beginning 43 minutes after the onset of reaction.

For each sample, volatile components were removed, and the I.V. of the polymer was measured. The results are shown in Table 12.

TABLE 12

| Time (min) | 43 | 85 | 128 | 170 | 213 | 256 |
|---|---|---|---|---|---|---|
| I.V. (dL/g) | 2.57 | 2.54 | 2.26 | 2.39 | 2.46 | 2.40 |

The mean I.V. was 2.44±0.12 dL/g (95% confidence) with a standard deviation of 0.11. This shows that the I.V. of polyhexene made in an extruder with a supported ZN catalyst can be kept fairly stable over time when the reaction mixture temperature is kept relatively constant.

Example 13

Polyhexene was prepared according to the procedure of Example 12 with some modifications.

The cocatalyst solution was AlEt$_3$-heptane and purified 1-hexene in a ratio of 8.4:1000, and the catalyst suspension was Lynx™ 715 catalyst and purified 1-hexene in a ratio of 83.2:10,000. The temperature of each zone of the extruder was maintained at approximately 40° C. The reaction was continued for 300 minutes, and samples were taken at various times beginning 43 minutes after the onset of reaction.

For each sample, volatile components were removed, and the I.V. of the polymer was measured. The results are shown in Table 13.

TABLE 13

| Time (min) | 43 | 85 | 128 | 170 | 213 | 256 |
|---|---|---|---|---|---|---|
| I.V. (dL/g) | 2.69 | 2.65 | 2.68 | 2.77 | 2.53 | 2.67 |

The mean I.V. was 2.67±0.08 dL/g (95% confidence) with a standard deviation of 0.08. This shows that the I.V. of polyhexene made in an extruder with a supported ZN catalyst can be kept fairly stable over time when the reaction mixture temperature is kept relatively constant.

Example 14

Copoly(octene-propylene) was prepared according to the procedure of Example 9 with minor modifications.

The monomer feed consisted of a 90:10 mixture of purified 1-octene and purified liquid propylene (Matheson Gas Products, Inc.; Montgomeryville, Pa.) that had been passed through a Matheson™ Gas Purifier Model 6406A (Matheson Gas Prods.) to reduce the water and oxygen concentrations to less than 1 ppm. The propylene was added under pressure (above 618 kPa so as to be maintained as a liquid) to a cylinder containing purified 1-octene, and both were shaken in the cylinder for approximately one minute to form a monomer mixture.

The cocatalyst solution was AlEt$_3$-heptane and purified 1-octene in a ratio of 6.9:1000, and the catalyst suspension was Lynx™ 715 catalyst and purified 1-octene in a ratio of 42.4:10,000. Purified 1-octene (at a rate of 27.6 g/min), cocatalyst solution (at a rate of 26.9 g/min), and catalyst suspension (at a rate of 47.1 g/min) were fed into the extruder for approximately 20 minutes, set at a screw speed of 25 rpm (which gave an approximate residence time of 17.1 minutes), until a polymer plug was formed in the extruder. Purified 1-octene feed was then replaced with purified monomer mixture at the same feed rate.

The temperature of each zone of the extruder was maintained at approximately 30° C. The reaction was run continued 136 minutes, and samples were taken at various times beginning 34 minutes after the onset of reaction.

For each sample, volatile components were removed, and the I.V. of the polymer was measured. The results are shown in Table 14.

TABLE 14

| Time (min) | 34 | 68 | 102 | 136 |
|---|---|---|---|---|
| I.V. (dL/g) | 3.05 | 2.83 | 2.89 | 2.93 |

The mean I.V. was 2.93±0.15 dL/g (95% confidence) with a standard deviation of 0.09. This shows that the I.V. of copoly(octene-propylene) made in an extruder with a supported ZN catalyst can be kept fairly stable over time when the reactor reaction mixture temperature is kept relatively constant.

Example 15

Polyhexene was prepared according to the procedure of Example 11 with some modifications.

Two different reactors were used in tandem such that the output of a 10 L STR was fed into the first section of an extruder using a flexible hose. A cocatalyst solution of AlEt$_3$-heptane and purified 1-hexene in a ratio of 1.8:1000 (at a rate of 10.1 g/min), and a catalyst suspension of Lynx™ 715 catalyst and purified 1-hexene in a ratio of 1.8:10,000 (at a rate of 25.8 g/min) were fed into the STR with purified 1-hexene (at a rate of 146.7 g/min). The temperature of each section was maintained at 45° C. The shaft speed was 200 rpm. The residence time of the reaction mixture in the STR was approximately 50 minutes.

The exiting reaction mixture was immediately conveyed via a flexible hose connection, into the first zone of an extruder along with additional cocatalyst solution, consisting of AlEt$_3$-heptane and purified 1-hexene in a ratio of 46.7:1000 (at a rate of 22.4 g/min) and additional catalyst suspension, consisting of Lynx™ 715 catalyst and purified 1-hexene in a ratio of 80.6:10,000 (at a rate of 37.9 g/min). The temperature of each section of the extruder was maintained at approximately 45° C. The extruder screw speed was set at 51 rpm, which gave an approximate residence time of 8.4 minutes.

The reaction was continued for 205 minutes, and samples were taken at various times beginning 35 minutes after the reaction mixture began to feed into the extruder. For each sample, volatile components were removed, and the I.V. of the polymer was measured. The results are shown in Table 15.

TABLE 15

| Time (min) | 35 | 69 | 103 | 135 | 169 | 203 |
|---|---|---|---|---|---|---|
| I.V. (dL/g) | 1.11 | 1.02 | 1.04 | 1.09 | 1.08 | 1.09 |

The mean I.V. was 1.07±0.04 dL/g (95% confidence) with a standard deviation of 0.03. This shows that the I.V. of polyhexene made in an STR extruder combination can be kept fairly stable over time when the reaction mixture temperature of both the STR and extruder are kept relatively constant.

Example 16

Copoly(octene-hexene) was prepared substantially according to the procedure of Example 2 with minor modifications.

The monomer feed consisted of a purified 1-octene monomer feed fed into the first section and a purified 1-hexene monomer feed fed into the downstream end of the second section. The cocatalyst solution was 25% AlEt$_3$-heptane and purified 1-hexene monomer in a ratio of 121:1000, and the catalyst suspension was Lynx™ 900 catalyst and hexane in a ratio of 61.4:10,000. Purified 1-hexene monomer (at a rate of 170.9 g/min), purified 1-octene monomer (at a rate of 56.9 g/min), cocatalyst solution (at a rate of 12.6 g/min), and the catalyst suspension (at a rate of 25.8 g/min) were fed into the STR.

The preheat temperature and the five section temperatures were all controlled to approximately 55° C. The reaction was continued for 150 minutes, and samples of the quenched reaction mixture were taken at five different times beginning 45 minutes after the onset of reaction.

For each sample, volatile components were removed and the I.V. of the polymer was measured. The results are shown in Table 16.

TABLE 16

| Time (min) | 45 | 60 | 100 | 130 | 150 |
|---|---|---|---|---|---|
| I.V. (dL/g) | 2.32 | 2.41 | 2.39 | 2.23 | 2.24 |

The mean I.V. was 2.32±0.05 dL/g (95% confidence) with a standard deviation of 0.08. This shows that the I.V. of the copoly(octene-hexene) can be kept fairly stable over time when the reaction mixture temperature is kept relatively constant.

Example 17

Copoly(octene-propylene) copolymer was prepared substantially according to the procedure of Example 15 with minor modifications.

The monomer feed consisted of a 81.8:18.2 mixture of purified 1-octene monomer and purified liquid propylene monomer. The cocatalyst solution was AlEt$_3$-heptane, purified 1-octene monomer, and polypropylene monomer in a ratio of 0.9:83.1:16.0 and the catalyst suspension was Lynx™ 715 catalyst and purified 1-octene monomer in a ratio of 42.6:10,000. The purified monomer mixture (at a rate of 20.9 g/min), the cocatalyst solution (at a rate of 33.2 g/min), and the catalyst suspension (at a rate of 46.9 g/min) were feed into the STR.

The reaction was continued for 136 minutes, and samples were taken at various times beginning 34 minutes after the onset of reaction.

For each sample, volatile components were removed and the I.V. of the polymer was measured. The results are shown in Table 17.

TABLE 17

| Time (min) | 34 | 68 | 102 | 136 |
|---|---|---|---|---|
| I.V. (dL/g) | 1.28 | 1.36 | 1.38 | 1.39 |

The mean I.V. was 1.35±0.05 dL/g (95% confidence) with a standard deviation of 0.05. This shows that the I.V. of the copoly(octene-propylene) copolymer can be kept fairly stable over time when the reaction mixture temperature is kept relatively constant.

Example 18

Polyoctene was prepared substantially according to the procedure of Example 8 with minor modifications.

The monomer feed consisted of a purified 1-octene monomer fed into the first section. Initially, the cocatalyst solution was 25% AlEt$_3$-heptane and purified 1-octene monomer in a ratio of 31:1000, and the catalyst suspension was Lynx™ 900 catalyst and hexane in a ratio of 26.0:10,000. The preheat temperature and the five zone temperatures were all approximately 70° C. The flow rates of the monomer, cocatalyst solution, catalyst suspension, and quench solution were 193.1 g/min, 17.9 g/min, 27.5 g/min and 10 g/min, respectively. The reaction was continued for 125 minutes during which six samples of the quenched reaction mixture were taken at different times beginning 50 minutes after the onset of reaction.

Immediately thereafter, the monomer flow rate was increased to 202.0 g/min, and the cocatalyst flow rate was decreased to 8.9 g/min. The reaction was continued for an additional 110 minutes until 235 minutes had elapsed since the onset of reaction. Eight samples of the quenched mixture were taken at different times over the 110 minutes. Because the residence time of the reactor was 30 minutes, samples taken up to 155 minutes after onset of reaction were of polymer from the first set of conditions and samples taken after 155 minutes were of polymer from the second set of conditions.

For each sample, volatile components were removed, and the I.V. of the polymer was measured. The results are shown in Table 18.

TABLE 18

| Time (min) | I.V. (dL/g) |
|---|---|
| 50 | 2.58 |
| 65 | 2.43 |
| 80 | 2.43 |
| 95 | 2.40 |
| 110 | 2.39 |
| 125 | 2.39 |
| 140 | 2.38 |
| 155 | 2.43 |
| 170 | 3.13 |
| 185 | 3.29 |
| 200 | 3.02 |
| 215 | 2.91 |
| 225 | 2.97 |
| 235 | 3.04 |

The mean I.V. of the first eight samples was 2.43±0.05 dL/g (95% confidence) with a standard deviation of 0.06. (The initial targeted I.V. was 2.4 dL/g.) The mean I.V. of the last six samples was 3.06±0.14 dL/g (95% confidence) with a standard deviation of 0.13. (The second targeted I.V. was 3.1 dL/g.) This shows that the I.V. of a polyoctene made in an STR with an unsupported ZN catalyst can be changed in a controlled manner as run conditions are changed. This control can be accomplished in a relatively short period of time (i.e., much less than five residence ties of the reactor) and can be maintained over an extended period of time.

In summary, the foregoing examples have shown that STRs and extruders can be used to make homo- and copolymers (from 1-alkenes) with predetermined I.V.'s (i.e., MWs). The examples can be summarized as follows:

| Example No. | Targeted I.V. | Monomer | Catalyst | Reactor | Temp. Profile |
|---|---|---|---|---|---|
| 1 | 0.6 | C$_8$ | M | 10 | Flat |
| 2 | 1.0 | C$_8$ | SZ | 10 | Flat |

-continued

| Example No. | Targeted I.V. | Monomer | Catalyst | Reactor | Temp. Profile |
|---|---|---|---|---|---|
| 3 | 1.3 | $C_8$ | SZ | 20 | Flat |
| 4 | 2.4 | $C_6$ | UZ | 20 | Flat |
| 5 | 2.5 | $C_8$ | UZ | 20 | Flat |
| 6 | 3.0 | $C_8$ | UZ | 20 | Rising |
| 7 | 3.5 | $C_8$ | UZ | 20 | Flat |
| 8 | 4.7 | $C_8$ | UZ | 10 | Flat |
| 9 | 1.7 | $C_8$ | SZ | E | Flat |
| 10 | 2.8 | $C_8$ | SZ | E | Flat |
| 11 | 1.6 | $C_6$ | SZ | E | Flat |
| 12 | 2.4 | $C_6$ | SZ | E | Flat |
| 13 | 2.7 | $C_6$ | SZ | E | Flat |
| 14 | 2.9 | $C_8/C_3$ | SZ | E | Flat |
| 15 | 1.4 | $C_6$ | SZ | 10/E | Flat |
| 16 | 2.3 | $C_6/C_8$ | UZ | 10 | Flat |
| 17 | 1.0 | $C_8/C_3$ | SZ | E | Flat |
| 18 | 2.4/3.1 | $C_8$ | UZ | 10 | Flat |

M = metallocene catalyst system
SZ = supported ZN catalyst system
UZ = unsupported ZN catalyst system
10 = 10 L STR
20 = 20 L STR
E = extruder
10/E = 10 L STR followed immediately by an extruder Various modifications and alterations that do not depart from the scope and spirit of this invention will become apparent to those skilled in the art. This invention is not to be unduly limited to the illustrative embodiments set forth herein.

We claim:

1. A process for the continuous production of a poly(α-olefin) having a targeted inherent viscosity, comprising the steps:
   a) in a reactor comprising one or more sections, the temperature of each of said sections being independently controllable so as to provide a temperature profile, mixing at least one α-olefin monomer that is or that can be made a liquid at a temperature of 20° to 100° C. and about 1000 kPa and a catalyst system useful in the polymerization of olefinic monomers, so as to form a reaction mixture that comprises
      1) said at least one monomer,
      2) said catalyst system, and
      3) the polymerization product of said at least one monomer; and
   b) allowing said at least one monomer to continue to polymerize while said reaction mixture travels in an essentially plug flow manner through said reactor,
said reactor being free of a hydrogen control feed, the inherent viscosity of said poly(α-olefin) remaining within 0.2 dL/g of said targeted inherent viscosity within five residence times of said reactor.

2. The process of claim 1 further comprising the step:
   c) during said polymerization step, varying said temperature profile so as to change said targeted inherent viscosity, the inherent viscosity of said poly(α-olefin) remaining within 0.2 dL/g of said changed targeted inherent viscosity within five residence times measured from the time of said changed targeted inherent viscosity.

3. The process of claim 1 wherein said catalyst system comprises one or more components.

4. The process of claim 3 further comprising the step
   c) during said polymerization step, varying at least one of
      1) the identity
      2) the amounts,
of said one or more components of said catalyst system so as to change said targeted inherent viscosity, the inherent viscosity of said poly(α-olefin) remaining within 0.2 dL/g of said changed targeted inherent viscosity within five residence times measured from the time of said changed targeted inherent viscosity.

5. The process of claim 1 wherein said reactor comprises a stirred tubular reactor.

6. The process of claim 1 wherein said reactor comprises an extruder.

7. The process of claim 6 wherein the conversion of monomer to polymerization product is at least about 95%.

8. The process of claim 6 wherein said extuder is a counter-rotating, twin screw extruder.

9. The process of claim 1 wherein said reaction system further comprises means for removing said at least one monomer from said reaction mixture.

10. The process of claim 1 wherein said catalyst system is a Ziegler-Natta system comprising a transition metal component and an organometallic cocatalyst.

11. The process of claim 9 wherein said transition metal component and said organometallic component are introduced separately into said reactor.

12. The process of claim 1 wherein said catalyst system is a metallocene catalyst system.

13. The process of claim 1 wherein said polymerization product is soluble in said reaction mixture.

14. The process of claim 1 wherein the inherent viscosity of said poly(α-olefin) remains within 0.15 dL/g of said targeted inherent viscosity within five residence times of the reactor.

15. The process of claim 1 wherein said at least one monomer comprises a straight chain $C_4$–$C_{24}$ α-olefin, or a branched $C_6$–$C_{24}$ α-olefin.

16. The process of claim 15 wherein said at least one α-olefin monomer is a straight chain $C_5$–$C_{12}$ α-olefin.

17. The process of claim 15 wherein said at least one α-olefin monomer is a straight chain $C_6$–$C_{10}$ α-olefin.

18. The process of claim 15 wherein said at least one monomer further comprises a polyene, gaseous α-olefin, or $C_{24}$–$C_{40}$ α-olefin.

19. The process of claim 1 wherein said reaction mixture further comprises a solvent.

20. The process of claim 1 wherein the temperature profile of said reactor is substantially flat.

* * * * *